United States Patent [19]

Wade

[11] 4,403,045

[45] Sep. 6, 1983

[54] ALKALI METAL BOROHYDRIDE CONCENTRATE

[75] Inventor: Robert C. Wade, Ipswich, Mass.

[73] Assignee: Thiokol Corporation, Chicago, Ill.

[21] Appl. No.: 454,505

[22] Filed: Dec. 29, 1982

Related U.S. Application Data

[62] Division of Ser. No. 398,056, Jul. 14, 1982, which is a division of Ser. No. 272,867, Jun. 12, 1981.

[51] Int. Cl.$^3$ ................................................ C08J 9/06
[52] U.S. Cl. ............................... 521/82; 264/DIG. 6;
521/79; 521/85; 521/89; 521/91; 521/97;
521/134; 521/139; 521/909
[58] Field of Search ................... 521/85, 79, 139, 89,
521/909, 91, 97, 134, 82

[56] References Cited

U.S. PATENT DOCUMENTS

| | | | |
|---|---|---|---|
| 2,758,980 | 8/1956 | Talalay et al. | 521/85 |
| 2,909,493 | 10/1959 | Busb | 521/145 |
| 2,930,771 | 3/1960 | Wade | 521/85 |
| 2,945,828 | 7/1960 | Henning | 521/95 |
| 2,951,819 | 9/1960 | Wade | 521/85 |
| 3,167,520 | 1/1965 | Wade | 521/85 |
| 3,331,790 | 7/1967 | Scheurlen et al. | 521/85 |
| 3,393,260 | 7/1968 | Miler | 521/79 |
| 3,511,788 | 5/1970 | Keil | 521/95 |
| 4,097,425 | 6/1978 | Niznik | 521/182 |
| 4,183,822 | 1/1980 | Collington et al. | 521/183 |
| 4,278,769 | 7/1981 | Gebauer et al. | 521/182 |

OTHER PUBLICATIONS

L. J. Guilbault, "Polyolefin Stabilization with SBH, Maintains Product Quality During Melt Processing", P.S.P. Newsletter Issue 4, Dec. 1980.

*Primary Examiner*—Morton Foelak
*Attorney, Agent, or Firm*—Gerald K. White

[57] ABSTRACT

Alkali metal borohydride concentrates are prepared by dry blending alkali metal borohydride powder with a dry non-reactive plastic resin, melting and extruding the blended mixture to form an encapsulated alkali metal borohydride concentrate, and then chopping the extrusion into pellets. The pellet concentrate may then be blended into other materials.

5 Claims, No Drawings

ALKALI METAL BOROHYDRIDE CONCENTRATE

This application is a division of application Ser. No. 98,056, filed July 14, 1982, which in turn is a division of application Ser. No. 272,867, filed June 12, 1981.

BACKGROUND OF THE INVENTION

The use of alkali metal borohydrides such as sodium borohydride and potassium borohydride as blowing agents in connection with the production of cellular articles is well known. For example, U.S. Pat. No. 2,951,819 utilizes an alkali metal borohydride in connection with the manufacture of cellular articles. U.S. Pat. No. 3,167,520 relates to cellular articles prepared from polystyrene by extruding polystyrene resin containing an alkali metal borohydride which decomposes during extrusion to form a cellular article. The invention of this application is directed to an improvement to the technique of aforesaid U.S. Pat. No. 3,167,520.

SUMMARY OF THE INVENTION

The invention involves the use of alkali metal borohydrides such as sodium and potassium borohydride as blowing agents useful in connection with the production of articles having a foamed or cellular structure. One particularly advantageous embodiment of the invention involves the use of a stable borohydride concentrate mixture containing from about 0.5% to 20% by weight of an alkali metal borohydride with a dry inert resinous polymer. The concentrate should contain no more than about 0.1% adsorbed water or the borohydride will hydrolyze. Such water may be adsorbed on the surface of the borohydride and/or on the surface of the resinous polymer.

The concentrates of the invention may be made by dry blending from 0.5% to 20% by weight of powdered alkali metal borohydride with a dry inert resinous polymer to form a mixture containing less than about 0.1% by weight water; heating the mixture to a temperature above that of the melting point of the resin to form a molten mixture; extruding the molten mixture and then cooling the extrusion to form a solid, stable concentrate; and then forming the cooled extrusioned concentrate into pellets by conventional techniques such as chopping, grinding and the like.

Another aspect of the invention comprises a method for making cellular articles by contacting a mixture of alkali metal borohydride and a resinous polymer with a high surface area silica activating agent having a proton source adsorbed on its surface so as to cause said alkali metal borohydride to hydrolyze thereby causing said resinous polymer to have a foamed cellular structure. The alkali metal borohydride may be in the form of the concentrate described above or as neat powdered alkali metal borohydride.

DETAILED DESCRIPTION OF THE INVENTION

The concentrates of the invention may be used to incorporate low levels of alkali meta borohydride into the same or different resins with the object of using the incorporated borohydride to foam the resin where an additional protonic activator such as water, alcohol or acid is also added to the resin to react with the borohydride to produce hydrogen.

When used as a blowing agent for thermoplastic resins, up to 0.5% $NaBH_4$ may be incorporated into the resin from the concentrate. The preferred range is up to 0.25%.

The use of concentrates to incorporate low levels of borohydride into resins has several advantages. First of all, the concentrates protect the borohydride from adventitious hydrolysis during handling and may be stored for periods on the order of a year without the occurrence of significant hydrolysis. Secondly, it is much easier to incorporate the borohydride at very low levels such as less than 1 wt.% into the resin by using the concentrates. Thirdly, overall handling such as weighing and making uniform mixtures is much easier using the concentrates than using neat borohydride. Because such highly reactive material has been concentrated and rendered substantially inert, employee safety is enhanced. In addition, very uniform dispersions of borohydride in the resin are obtained using the concentrates.

The stable borohydride concentrate of the invention comprises from about 0.5% to 20% by weight of an alkali metal borohydride, less than about 0.1% adsorbed water, balance essentially being dry inert resinous polymer. The 0.5% lower limit for borohydrides was selected primarily because lower concentrations would necessarily involve the use of excessive amounts of the concentrate and the 20% upper limit was selected because higher levels would require excessively small amounts of the concentrate and thereby hamper the attainment of uniform dispersion in the thermoplastic polymer to be foamed. It is preferred to include the alkali metal borohydride in amounts between 2 and 10% because such range permits let-down ratios on the order of about 20:1 as are normally desired in the industry. Sodium and potassium borohydrides are contemplated for use in connection with the invention. The concentrate should contain no more than about 0.1% by weight of adsorbed water, preferably not more than about 0.01%, in order to prevent hydrolysis of the borohydride. Thus, the borohydride and resin must be very dry when mixed to form the concentrate and moisture pick-up should be avoided during such mixing.

The inert resinous polymer component of the concentrate comprises resins in which reactive protonic hydrogen atoms are substantially absent. Such resins include polyolefins, polydienes, polystyrene, polyphenyleneoxide-styrene, polyacrylates, polyvinylchloride, polyvinylacetate and the like.

The alkali metal borohydride concentrates of the invention are prepared by dry blending from about 0.5% to 20% by weight of the borohydride with the inert resinous polymer to form a dry mixture thereof. The mixture should contain less than about 0.1% of adsorbed water. The mixture is then treated to a temperature in excess of the melting point of the resin, extruded, cooled, and formed into pellets.

As mentioned previously, the alkali metal borohydride has utility as a blowing agent in connection with the manufacture of cellular or foamed resinous articles. Typical resinous polymers that may be foamed with use of the concentrate include but are not limited to polyolefins, polydienes, polystyrene, polyphenyleneoxide-styrene, polyacryletes, polyvinylchloride, polyvinylacetate and the like.

Cellular articles may be manufactured by mixing the alkali metal borohydride concentrate mentioned above with a resinous polymer and an effective amount of an activating agent capable of donating an acidic proton to the alkali metal borohydride so as to hydrolyze substantially all of the alkali metal borohydride while the resinous polymer is molten and thus form a cellular article. The activating agent may comprise a finely divided high surface area solid having a proton source adsorbed on its surface. A preferred activating agent is finely divided high surface area silica.

An example of a form of silica suitable for use in the invention is that manufactured by Cabot Corporation under the designation "CAB-O-SIL". Such type of silica is manufactured by fuming. It is preferred to utilize silica having a surface pH of less than 7 because acidic materials aid in the decomposition of alkali metal borohydrides. It is especially preferred to have a pH in the range of 4 or lower. Finely divided, high surface area activating agents function to provide nucleation sites for foam to form. These materials have a very high capacity for adsorbing liquids such as water and yet remain a free-flowing solid so as to thereby aid in the promotion of uniformity during the blending or mixing stage of the process.

Suitable proton sources include water, mineral acids, carboxylic acids, alcohols, sulfonic acids, polyacrylic acid, polystyrene sulfonic acid and like materials. Water is preferred due to its relative cost, availability, and low corrosivity.

It has also been discovered that the silica activators described above may also be used in combination with alkali metal borohydride materials other than the concentrate described above. For example, powdered alkali metal borohydrides may be utilized in combination with the silica activators to produce foamed polymers. As in the case of the concentrate additions, the alkali metal borohydride and a resinous polymer are contacted with a sufficient amount of activating agent to cause substantially all of the borohydrides to hydrolyze.

The following examples further illustrate the practice of the invention.

EXAMPLE 1

Sodium borohydride was concentrated in polypropylene by the following procedure. Ninety parts by weight of previously dried, powdered, unstabilized polypropylene resin (melt index 12) and 10 parts by weight of $NaBH_4$ that was previously dried 24 hrs at 100° C., were thoroughly mixed in a dry blender. The resultant mixture was extruded through a ⅛ inch diameter die at about 450° F. The extruded rod was pelletized in line with the extruder. The extruded concentrate was examined with a low power microscope and an extremely uniform dispersion of minute borohydride particles was found. Virtually no gas bubbles were observed in the resin pellets.

EXAMPLE 2

Sodium borohydride was concentrated in NORYL resins in the following manner. Ninety parts by weight of dry NORYL resin FN 215, a proprietary General Electric Co. blend of polyphenylene oxide and polystyrene in pellet form, was mixed with 0.1 part by weight of mineral oil and 10 parts by weight of $NaBH_4$ powder, that was previously dried at 100° C. for 8 hrs. The resultant dry blended mixture was then extruded at about 450° F. and pelletized as described in the previous example. The concentrate pellets were equivalent to the pellets of Example 1.

EXAMPLE 3

Sodium borohydride was concentrated in polystyrene with use of the following procedure. Ninety parts by weight of previously dried high impact polystyrene pellets was blended with 0.1 part of mineral oil and 10 parts by weight of dry $NaBH_4$ powder. The resultant mixture was then extruded at about 450° F. and pelletized as described in Example 1. As in Example 1, an excellent dispersion of minute particles of $NaBH_4$ in the resin was produced with virtually no gas bubbles observed.

EXAMPLE 4

An activating agent concentrate was prepared by the following procedure. 28.6 parts by weight of CAB-O-SIL fumed silica was intensively mixed with 71 parts by weight of a solution (65% solids) of polyacrylic acid in water for five minutes with use of a Henschel mixer. The resultant mixture was a "dry" free flowing powder.

EXAMPLE 5

The procedure described in Example 4 was also used to prepare an activator concentrate containing 71.4 parts by weight of water. The water was added slowly to 28.6 parts by weight of CAB-O-SIL fumed silica while mixing. The concentrate handled as a "dry" powder.

EXAMPLE 6

Polypropylene foamed fibers were prepared as follows. The series of blends of polypropylene resin powder, sodium borohydride, and CAB-O-SIL whose compositions are shown in Table I were prepared. The polypropylene powder was not dried prior to blending, but rather was blended in the "as-received" condition.

TABLE I

| Polypropylene | 99.89 | 99.75 | 99.5 | 99.95 | 99.92 |
|---|---|---|---|---|---|
| $NaBH_4$ | 0.1 | 0.25 | 0.5 | 0.05 | 0.075 |
| CAB-O-SIL | 0.001 | 0.0025 | 0.005 | 0.005 | 0.00075 |

These mixtures of Table I were extruded through a ¾ inch diameter die at 430°–440° F. to form filaments with varying amounts of oriented foamed cells. A 3½:1 compression ratio was employed. The moisture present on the $NaBH_4$ and the resin was sufficient to activate the release of hydrogen to foam the fibres as they passed through the melt phase in the extruder.

EXAMPLE 7

Foamed polypropylene structural parts were prepared by the following procedure. Blends of undried polypropylene resin powder, sodium borohydride, powdered stearic acid and CAB-O-SIL were prepared in a Henschel Mixer. Stearic acid functioned as the activator and CAB-O-SIL as the nucleating agent for bubble formation in this system. This system was limited to 1% stearic acid activator due to the limited solubility of the acid in the solid resin and because the lubricity in the barrel of the extruder provided by the molten stearic acid causes slippage of the screw. Although good foams were prepared with good density reduction, stearic acid and other fatty acids are less than ideal activators because of the above mentioned factors. In any event, structural foam parts of good quality were produced on a reciprocating screw L/D 16:1, 100 ton, 5 oz. injection molding machine equipped with a cut off nozzle. The compositions shown in Table II were so produced. All percentages are based on the weight of polypropylene resin.

TABLE II

| SBH % | Fumed Silica % | Stearic Acid % | % Wt. Reduction of Part Due to Foam |
|---|---|---|---|
| 0.06 | 0.1 | 1.0 | 20.2 |
| 0.13 | 0.1 | 1.0 | 27.3 |
| 0.25 | 0.1 | 1.0 | 34.4 |
| 0.5 | 0.1 | 1.0 | 37.3 |
| 1.0 | 0.1 | 1.0 | 33.7 |

EXAMPLE 8

Foamed polystyrene structural parts were prepared by the following procedure. Polystyrene resin powder, the sodium borohydride concentrate prepared in Example 3, and either the activator of Example 4 or Example 5 were blended in the proportion shown in Table III. All percentages are based upon the weight of the resin.

TABLE III

| % Conc. of Example 3 $NaBH_4$ Chemical Blowing Agent | % Conc. of Example 5 $H_2O$ Activator | % Conc. of Example 4 Polyacrylic Acid Activator | % Part Wt. Reduction |
|---|---|---|---|
| 1 | 0.56 | | 16 |
| 1 | 0.28 | | 15.1 |
| 2 | 0.28 | | 18.4 |
| 4 | 2.24 | | 26.8 |
| 8 | 2.24 | | 25.5 |
| | | 1.15 | 14.4 |
| 1 | 0.14 | | 12 |
| 4 | 0.56 | | 23.3 |
| 25 | 0.7 | | 25.6 |

Excellent quality foams having very fine uniform pore size were produced with use of a structural foam injection machine. Density reductions of about 25% using only 4% of the blowing agent concentrate (0.4% $NaBH_4$) and 2.24% of the silica/water activator concentrate are unusually high and very desirable for this type of structural foam. Normally, with nitrogen injection to provide cells, density reductions of less than 20% are achieved. Moreover, the borohydride blown foam was unusually white, whereas the nitrogen blown foams have a slightly yellow cast. These Activator concentrates such as water, organic acids, alcohols, etc. adsorbed on colloidal silica serve as ideal activators and nucleating agents of these systems because the activators can be premixed with blowing agent concentrates in the desired ratio with no reaction occurring. This mixture can then be blended with the resin to be foamed in the desired ratio and fed into the foaming machine to produce the foamed article.

EXAMPLE 9

Extruded foamed sheets of NORYL resin were manufactured by the following technique. NORYL resin was blended with the sodium borohydride blowing agent concentrate of Example 3 and an organic acid according to the percentages listed in Table IV. All percentages are based on the weight of NORYL resin. These mixtures were extruded with a ¾ inch diameter extruder.

TABLE IV

| Chemical Blowing Agent | % Chemical Blowing Agent | Acid Activator | Acid/Sodium Borohydride Mole Ratio | Degree of Foam |
|---|---|---|---|---|
| Example 3 | 1.0 | Oleic | 4/1 | Highly foamed |
| Example 3 | 1.0 | Octanoic | 4/1 | Highly foamed |
| Neat $NaBH_4$ | 0.1 | Octanoic | 4/1 | Highly foamed |
| Example 3 | 1.0 | Stearic | 4/1 | Highly foamed |
| Example 3 | 1.0 | — | — | Very slight |

It can be observed from this example that practically no foaming occurs where the chemical blowing agent is used in the absence of an activator. Furthermore, the $NaBH_4$ concentrates are just as efficient as an equivalent amount of Neat $NaBH_4$ for blowing. Neat $NaBH_4$ suffers many other deficiencies previously described which are overcome by the concentrates of the invention.

I claim:

1. A method for making a cellular resinous article comprising:
   contacting alkali metal borohydride and a resinous polymer with an effective amount of a finely divided high surface area silica activating agent having a surface pH of less than 7 and having a proton source adsorbed on its surface so as to cause said alkali metal borohydride to hydrolyze, thereby creating foam and thereby causing said resinous polymer to have a cellular structure, said hydrolyzing occurring while the resinous polymer is in the molten condition.

2. The method of claim 1 wherein:
   said alkali metal borohydride is a memeber selected from the group consisting of sodium borohydride or potassium borohydride.

3. The method of claim 1 wherein:
   said alkali metal borohydride is in a powdered form.

4. The method of claim 1 wherein:
   said proton source is selected from a member of the group consisting of water, mineral acid, carboxylic acids, alcohol, sulfonic acids, polyacrylic acid, or polystyrene sulfonic acid.

5. The method of claim 1 wherein:
   said alkali metal borohydride is sodium borohydride.

* * * * *